(12) United States Patent
Haddad (10) Patent No.: US 10,525,510 B2
(45) Date of Patent: Jan. 7, 2020

(54) GAS LINE CLEANOUT ASSEMBLY

(71) Applicant: Joseph Haddad, Dearborn Heights, MI (US)

(72) Inventor: Joseph Haddad, Dearborn Heights, MI (US)

( * ) Notice: Subject to any disclaimer, the term of this patent is extended or adjusted under 35 U.S.C. 154(b) by 253 days.

(21) Appl. No.: 15/653,997

(22) Filed: Jul. 19, 2017

(65) Prior Publication Data

US 2019/0022714 A1  Jan. 24, 2019

(51) Int. Cl.
| | | |
|---|---|---|
| *B08B 9/032* | (2006.01) | |
| *B08B 9/027* | (2006.01) | |
| *B08B 9/043* | (2006.01) | |
| *B08B 9/00* | (2006.01) | |
| *E21B 23/08* | (2006.01) | |

(52) U.S. Cl.
CPC ............ *B08B 9/032* (2013.01); *B08B 9/027* (2013.01); *B08B 9/0433* (2013.01); *B08B 9/00* (2013.01); *E21B 23/08* (2013.01)

(58) Field of Classification Search
CPC ......... F16L 41/04; F16L 41/045; F16L 41/06; F16L 41/065; F16L 45/00; F16L 55/124; F16L 55/46
See application file for complete search history.

(56) References Cited

U.S. PATENT DOCUMENTS

| | | | |
|---|---|---|---|
| 2,767,415 A | 10/1956 | Morris | |
| 3,055,637 A | 9/1962 | Moore, Jr. | |
| 3,299,459 A * | 1/1967 | McCune | F16L 55/46 15/3.51 |
| 3,585,699 A * | 6/1971 | Shuttle | F16L 41/04 137/15.08 |
| 3,734,112 A * | 5/1973 | Finney | F16L 41/06 137/15.13 |
| 3,775,805 A | 12/1973 | Mitchell et al. | |
| 3,782,411 A * | 1/1974 | Turner | F16K 17/00 137/467 |
| 3,905,396 A * | 9/1975 | Peterson | F16L 41/06 138/89 |
| 5,198,037 A | 3/1993 | Guyonnet et al. | |
| 5,226,207 A | 7/1993 | Elzaurdia | |
| 6,578,877 B1 * | 6/2003 | Sundholm | F16L 41/06 285/133.11 |
| 8,931,131 B1 | 1/2015 | Feduke | |
| 9,217,245 B2 | 12/2015 | Yu | |

* cited by examiner

*Primary Examiner* — Spencer E Bell (57) ABSTRACT

A gas line cleanout assembly for clearing blockages in gas lines includes a block. A recess, positioned in a bottom of the block, is shaped complementarily to a section of a gas line and is configured to position the block on the gas line. A coupler that is coupled to the block is configured to couple to the gas line to couple the block to the gas line. A first channel is positioned through the block and is configured to align with a tap that is positioned in the gas line. The first channel extends angularly from a top to the bottom of the block. A tube is coupled to and extends transversely from the top of the block. The tube is aligned with the first channel and is configured to insert an object through the first channel and the tap into the gas line to service the gas line.

12 Claims, 5 Drawing Sheets

GAS LINE CLEANOUT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cleanout assemblies and more particularly pertains to a new cleanout assembly for clearing blockages in gas lines.

BRIEF SUMMARY OF THE INVENTION

An embodiment of the disclosure meets the needs presented above by generally comprising a block. A recess, positioned in a bottom of the block, is shaped complementarily to a section of a gas line and is configured to position the block on the gas line. A coupler that is coupled to the block is configured to couple to the gas line to couple the block to the gas line. A first channel is positioned through the block and is configured to align with a tap that is positioned in the gas line. The first channel extends angularly from a top to the bottom of the block. A tube is coupled to and extends transversely from the top of the block. The tube is aligned with the first channel and is configured to insert an object through the first channel and the tap into the gas line to service the gas line.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
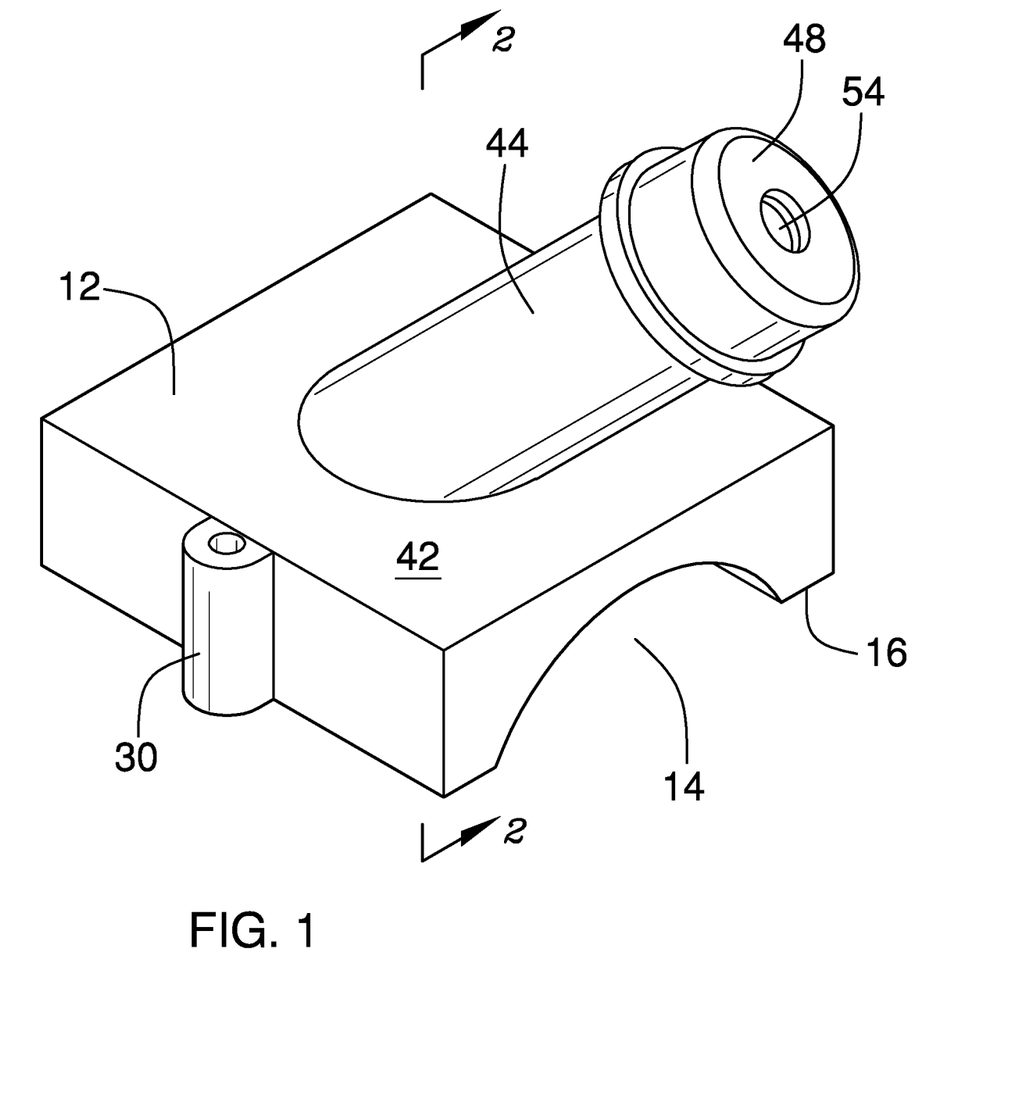
FIG. 1 is an isometric perspective view of a gas line cleanout assembly according to an embodiment of the disclosure.
Figure 2:
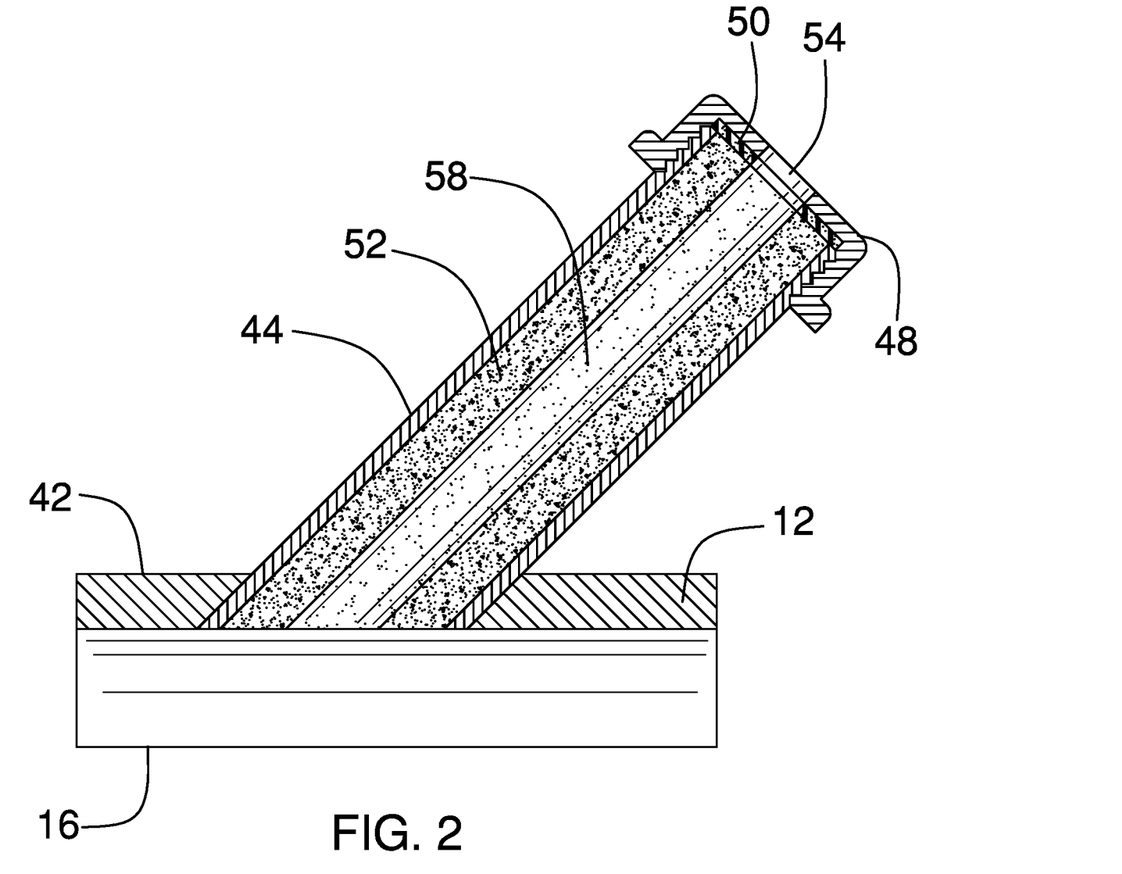
FIG. 2 is a cross-sectional view of an embodiment of the disclosure.
Figure 3:
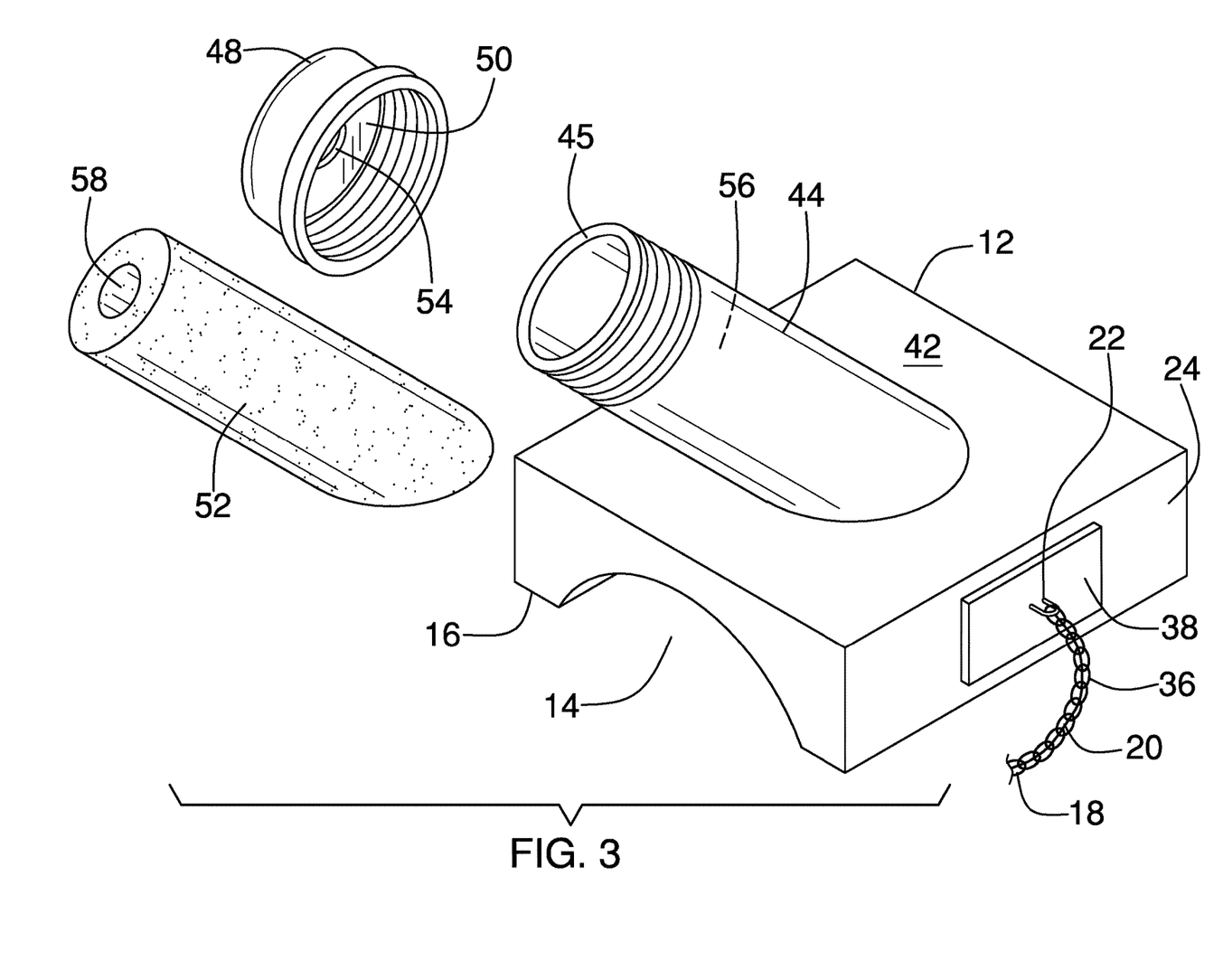
FIG. 3 is an exploded view of an embodiment of the disclosure.
Figure 4:
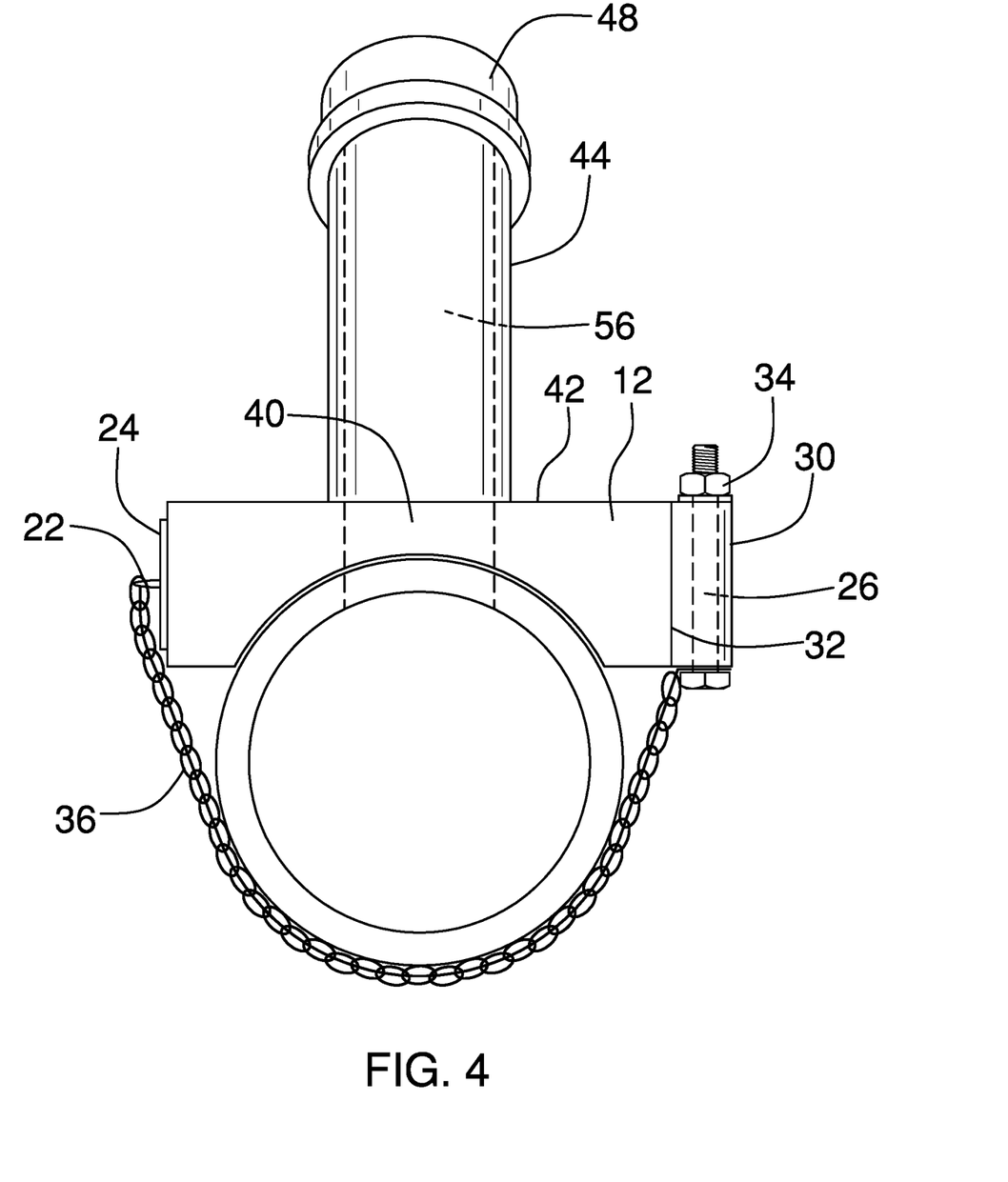
FIG. 4 is an in-use view of an embodiment of the disclosure.
Figure 5:
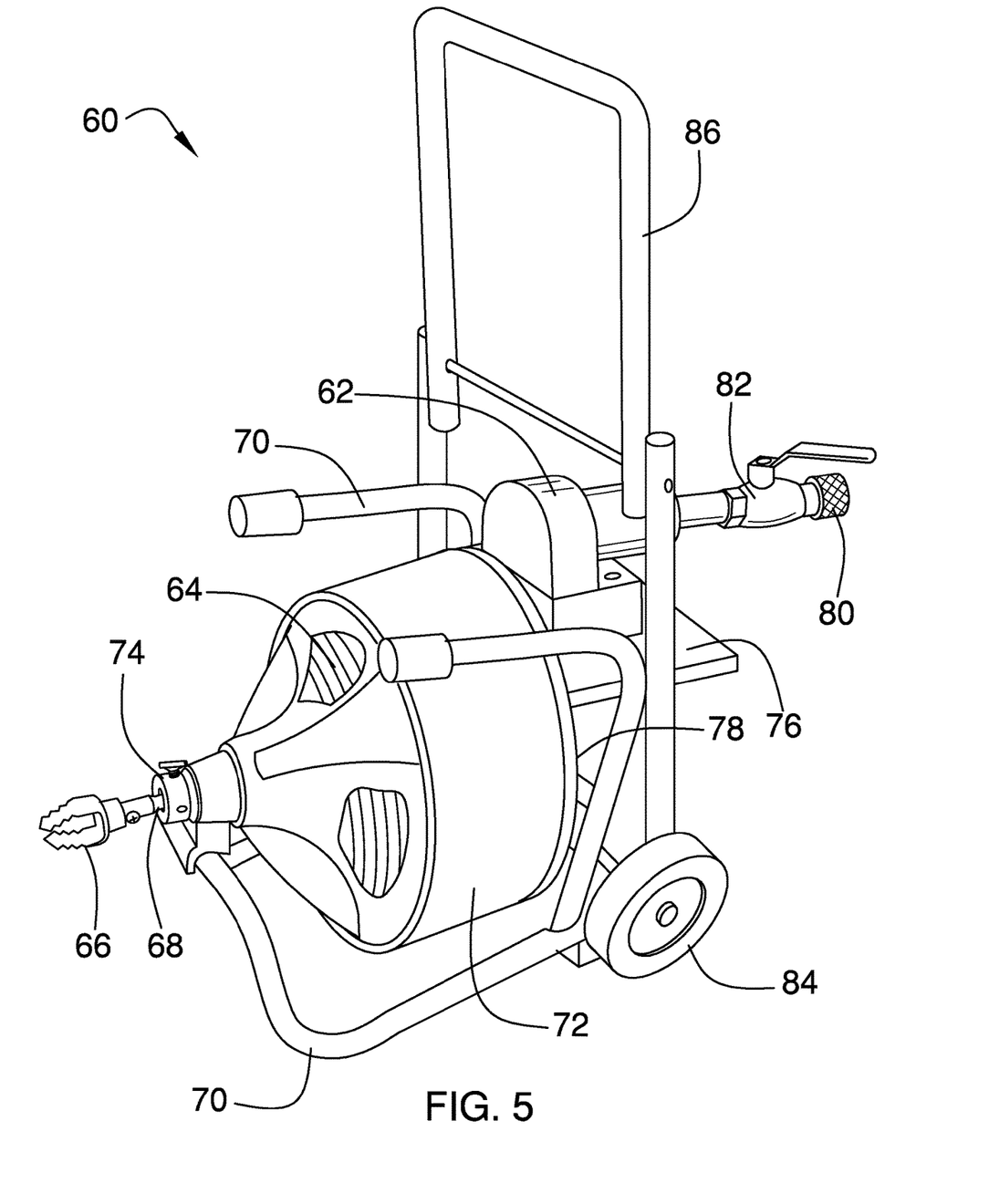
FIG. 5 is an isometric perspective view of an embodiment of the disclosure.

With reference now to the drawings, and in particular to FIGS. 1 through 5 thereof, a new cleanout assembly embodying the principles and concepts of an embodiment of the disclosure and generally designated by the reference numeral 10 will be described.

As best illustrated in FIGS. 1 through 5, the gas line cleanout assembly 10 generally comprises a block 12. In one embodiment, the block 12 is substantially rectangularly box shaped. In another embodiment, the block 12 comprises aluminum.

A recess 14 is positioned in a bottom 16 of the block 12. The recess 14 is shaped complementarily to a section of a gas line. The recess 14 is configured to position the block 12 on the gas line.

A coupler 18 is coupled to the block 12. The coupler 18 is configured to couple to the gas line to couple the block 12 to the gas line. In one embodiment, the coupler 18 comprises a strap 20. The strap 20 has a first end 22 that is coupled to a first side 24 of the block 12. A bolt 26 is coupled to a second end 28 of the strap 20. A cylinder 30 is coupled to a second side 32 of the block 12. The cylinder 30 is positioned to insert the bolt 26 so that the strap 20 extends from the block 12 around the gas line. The bolt 26 is positioned to couple to a nut 34 that is complementary to the bolt 26 so that the strap 20 is coupled to the block 12. The block 12 is coupled to the gas line.

In another embodiment, the strap 20 comprises a chain 36. A first plate 38 is coupled to the first side 24 of the block 12. The first end 22 of the strap 20 is welded to the first plate 38.

A first channel 40 is positioned through the block 12. The first channel 40 extends angularly from a top 42 to the bottom 16 of the block 12. The first channel 40 is configured to align with a tap that is positioned in the gas line. In one embodiment, the first channel 40 is centrally positioned on the top 42.

A tube 44 is coupled to and extends transversely from the top 42 of the block 12. The tube 44 is aligned with the first channel 40. The tube 44 is configured to insert an object through the first channel 40 and the tap into the gas line to service the gas line, such as by clearing a blockage in the gas line, such as a calcium deposit. In one embodiment, the tube 44 is circularly shaped when viewed longitudinally. The tube 44 has a terminus 46 distal from the block 12. The terminus 46 is open. The tube 44 is externally threaded proximate to the terminus 46. In another embodiment, the tube 44 comprises aluminum.

The device 10 comprises a cap 48, at least one gasket 50, and a plug 52. The cap 48 is complementary to the terminus 46 of the tube 44. The cap 48 is configured to couple to the tube 44 to close the terminus 46. The cap 48 comprises aluminum. A hole 54 is centrally positioned through the cap 48. The hole 54 is substantially complementary to the object that is to be inserted through the first channel 40 and the tap into the gas line. The object is slidably positionable and rotatable relative to the tube 44.

The at least one gasket 50 is complementary to and positioned in the cap 48. The at least one gasket 50 is annular disk shaped. The at least one gasket 50 is positioned to sealably couple the cap 48 to the tube 44. In one embodiment, the at least one gasket 50 comprises rubber.

The plug 52 is complementary to and positioned in an interior 56 of the tube 44. In one embodiment, the plug 52 comprises wax. A second channel 58 is positioned through the plug 52. The second channel 58 is complementary to and aligned with the hole 54 in the cap 48. The second channel 58 is positioned to insert the object. The plug 52 is configured to substantially seal the object within the tube 44 to deter leakage of gas from the gas line.

In one embodiment, the device 10 comprises a snaking device 60. The snaking device 60 comprises a motor 62, a coiled rod 64, and a bit 66. The coiled rod 64 is operationally coupled to the motor 62. The bit 66 is reversibly couplable to an endpoint 68 of the coiled rod 64. The hole 54, the second channel 58, and first channel 40 are positioned to insert the coiled rod 64. The plug 52 is configured to substantially seal the coiled rod 64 within the tube 44 to deter leakage of the gas from the gas line. The endpoint 68 of the coiled rod 64 is positioned to couple to the bit 66. The coupler 18 is configured to couple to the gas line to couple the block 12 to the gas line. The bit 66 is configured to be inserted through the tap into in the gas line. The motor 62 is positioned to rotate the coiled rod 64 so that the bit 66 rotates coincidently with the coiled rod 64. The coiled rod 64 is positioned to be selectively extended from the snaking device 60 into the gas line. The bit 66 is configured to grind the blockage in the gas line, such as the calcium deposit, to clear the blockage.

In one embodiment, the snaking device 60 comprises a frame 70 that is tubular. A shell 72 is coupled to the frame 70. The coiled rod 64 is positioned in the shell and is selectively extensible from a front 74 of the shell 72. The shell 72 is cylindrically shaped and is tapered adjacent to the front 74.

A second plate 76 is coupled to the frame 70. The second plate 76 is positioned on a back 78 of the shell 72. The motor 62 is coupled to the second plate 76. The motor 62 is air powered. A connector 80 is coupled to the motor 62. The connector 80 is configured to couple the motor 62 to a compressed air supply.

A valve 82 is coupled to and is positioned between the motor 62 and the connector 80. The valve 82 is two-way. The valve 82 is configured to regulate air flow to the motor 62 from the compressed air supply.

A pair of wheels 84 and a handle 86 are coupled to the frame 70. The handle 86 is configured to motivate the frame 70 upon the wheels 84.

In use, the hole 54, the second channel 58, and first channel 40 are positioned to insert the coiled rod 64. The plug 52 is configured to substantially seal the coiled rod 64 within the tube 44 to deter leakage of the gas from the gas line. The recess 14 is configured to position the block 12 on the gas line. The coupler 18 is configured to couple to the gas line to couple the block 12 to the gas line. The first channel 40 is aligned with the tap that is positioned in the gas line. The bit 66 is configured to be inserted through the tap into the gas line. The motor 62 is positioned to rotate the coiled rod 64 so that the bit 66 rotates coincidently with the coiled rod 64. The coiled rod 64 is positioned to be selectively extended from the snaking device 60 into the gas line. The bit 66 is configured to grind the blockage in the gas line, such as the calcium deposit, to clear the blockage. The connector 80 is configured to couple the motor 62 to the compressed air supply. The valve 82 is configured to regulate the air flow to the motor 62 from the compressed air supply.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A gas line cleanout assembly comprising:
a block;
a recess positioned in a bottom of said block, said recess being shaped complementarily to a section of a gas line;
a coupler coupled to said block, said coupler being configured for coupling to the gas line;
a first channel positioned through said block, said first channel extending angularly from a top to said bottom of said block;
a tube coupled to and extending transversely from said top of said block, said tube being aligned with said first channel;
wherein said recess is positioned in said block such that said recess is configured for positioning said block on the gas line, wherein said coupler is positioned on said block such that said coupler is configured for coupling to the gas line for coupling said block to the gas line, wherein said first channel is positioned in said block such that said first channel is configured for aligning with a tap positioned in the gas line, wherein said tube is positioned on said block such that said tube is configured for inserting an object through said first channel and the tap into the gas line for servicing the gas line, such as by clearing a blockage in the gas line, such as a calcium deposit;

said tube being circularly shaped when viewed longitudinally, said tube having a terminus distal from said block, said terminus being open, said tube being externally threaded proximate to said terminus;

a cap complementary to said terminus of said tube, said cap being configured for coupling to said tube for closing said terminus, said cap comprising aluminum;

a hole centrally positioned through said cap, said hole being substantially complementary to the object to be inserted through said first channel and the tap into the gas line;

at least one gasket complementary to and positioned in said cap, said at least one gasket being annular disk shaped;

a plug complementary to and positioned in an interior of said tube, said plug comprising wax;

a second channel positioned through said plug, said second channel being complementary to and aligned with said hole in said cap; and wherein said hole is positioned in said cap such that said hole is positioned for inserting the object such that the object is slidably positionable and rotatable relative to said tube, wherein said at least one gasket is positioned in said cap such that said at least one gasket is positioned for sealably coupling said cap to said tube, wherein said second channel is positioned in said plug such that said second channel is positioned for inserting the object such that said plug is configured for substantially sealing the object within said tube for deterring leaking of gas from the gas line.

2. The device of claim 1, further including said block being substantially rectangularly box shaped.

3. The device of claim 1, further including said block comprising aluminum.

4. The device of claim 1, further including said coupler comprising:

a strap having a first end coupled to a first side of said block;

a bolt coupled to a second end of said strap;

a nut complementary to said bolt;

a cylinder coupled to a second side of said block; and wherein said cylinder is positioned on said block such that said cylinder is positioned for inserting said bolt such that said strap extends from said block around the gas line, wherein said bolt is positioned for coupling to said nut such that said strap is coupled to said block such that said block is coupled to the gas line.

5. The device of claim 4, further comprising:

said strap comprising a chain; and a first plate coupled to said first side of said block, said first end of said strap being weldedly coupled to said first plate.

6. The device of claim 1, further including said first channel being centrally positioned on said top.

7. The device of claim 1, further including said at least one gasket comprising rubber.

8. A gas line cleanout assembly comprising:

a block;

a recess positioned in a bottom of said block, said recess being shaped complementarily to a section of a gas line;

a coupler coupled to said block, said coupler being configured for coupling to the gas line;

a first channel positioned through said block, said first channel extending angularly from a top to said bottom of said block;

a tube coupled to and extending transversely from said top of said block, said tube being aligned with said first channel;

wherein said recess is positioned in said block such that said recess is configured for positioning said block on the gas line, wherein said coupler is positioned on said block such that said coupler is configured for coupling to the gas line for coupling said block to the gas line, wherein said first channel is positioned in said block such that said first channel is configured for aligning with a tap positioned in the gas line, wherein said tube is positioned on said block such that said tube is configured for inserting an object through said first channel and the tap into the gas line for servicing the gas line, such as by clearing a blockage in the gas line, such as a calcium deposit;

said tube being circularly shaped when viewed longitudinally, said tube having a terminus distal from said block, said terminus being open, said tube being externally threaded proximate to said terminus;

a cap complementary to said terminus of said tube, said cap being configured for coupling to said tube for closing said terminus, said cap comprising aluminum;

a hole centrally positioned through said cap, said hole being substantially complementary to the object to be inserted through said first channel and the tap into the gas line;

at least one gasket complementary to and positioned in said cap, said at least one gasket being annular disk shaped;

a plug complementary to and positioned in an interior of said tube;

a second channel positioned through said plug, said second channel being complementary to and aligned with said hole in said cap;

wherein said hole is positioned in said cap such that said hole is positioned for inserting the object such that the object is slidably positionable and rotatable relative to said tube, wherein said at least one gasket is positioned in said cap such that said at least one gasket is positioned for sealably coupling said cap to said tube, wherein said second channel is positioned in said plug such that said second channel is positioned for inserting the object such that said plug is configured for substantially sealing the object within said tube for deterring leaking of gas from the gas line; and a snaking device comprising a motor, a coiled rod, and a bit, said coiled rod being operationally coupled to said motor, said bit being reversibly couplable to an endpoint of said coiled rod, wherein said hole is positioned in said cap, said second channel is positioned in said plug, and said first channel is positioned through said block such that said hole, said second channel, and said first channel are positioned for inserting said coiled rod such that said plug is configured for substantially sealing said coiled rod within said tube for deterring leaking of the gas from the gas line, wherein said endpoint of said coiled rod is positioned for coupling to said bit, wherein said coupler is positioned on said block such that said coupler is configured for coupling to the gas line for coupling said block to the gas line such that said bit is configured for inserting into the tap for positioning in the gas line, wherein said motor is positioned for rotating said coiled rod such that said bit rotates coincidently with said coiled rod, wherein said coiled rod is positioned for selectively extending from said snaking device into the gas line such that said bit is configured for grinding the blockage in the gas line, such as the calcium deposit, for clearing the blockage.

9. The device of claim 8, further comprising:
a frame, said frame being tubular;
a shell coupled to said frame, said coiled rod being positioned in and selectively extensible from a front of said shell;
a second plate coupled to said frame, said second plate being positioned on a back of said shell, said motor being coupled to said second plate, said motor being air powered;
a connector coupled to said motor;
a valve coupled to and positioned between said motor and said connector, said valve being two-way; and
wherein said connector is positioned on said motor such that said connector is configured for coupling said motor to a compressed air supply, wherein said valve is positioned on said motor such that said valve is configured for regulating air flow to said motor from the compressed air supply.

10. The assembly of claim 9, further including said shell being cylindrically shaped, said shell being tapered adjacent to said front.

11. The assembly of claim 9, further comprising:
a pair of wheels coupled to said frame;
a handle coupled to said frame; and
wherein said handle is positioned on said frame such that said handle is configured for motivating said frame upon said wheels.

12. A gas line cleanout assembly comprising:
a block, said block being substantially rectangularly box shaped, said block comprising aluminum;
a recess positioned in a bottom of said block, said recess being shaped complementarily to a section of a gas line, wherein said recess is positioned in said block such that said recess is configured for positioning said block on the gas line;
a coupler coupled to said block, said coupler being configured for coupling to the gas line, wherein said coupler is positioned on said block such that said coupler is configured for coupling to the gas line for coupling said block to the gas line, said coupler comprising:
 a strap having a first end coupled to a first side of said block, said strap comprising a chain,
 a first plate coupled to said first side of said block, said first end of said strap being weldedly coupled to said first plate,
 a bolt coupled to a second end of said strap,
 a nut complementary to said bolt, and
 a cylinder coupled to a second side of said block, wherein said cylinder is positioned on said block such that said cylinder is positioned for inserting said bolt such that said strap extends from said block around the gas line, wherein said bolt is positioned for coupling to said nut such that said strap is coupled to said block such that said block is coupled to the gas line;
a first channel positioned through said block, said first channel extending angularly from a top to said bottom of said block, wherein said first channel is positioned in said block such that said first channel is configured for aligning with a tap positioned in the gas line, said first channel being centrally positioned on said top;
a tube coupled to and extending transversely from said top of said block, said tube being aligned with said first channel, wherein said tube is positioned on said block such that said tube is configured for inserting an object through said first channel and the tap into the gas line for servicing the gas line, such as by clearing a blockage in the gas line, such as a calcium deposit, said tube being circularly shaped when viewed longitudinally, said tube having a terminus distal from said block, said terminus being open, said tube being externally threaded proximate to said terminus, said tube comprising aluminum;
a cap complementary to said terminus of said tube, said cap being configured for coupling to said tube for closing said terminus, said cap comprising aluminum;
a hole centrally positioned through said cap, said hole being substantially complementary to the object to be inserted through said first channel and the tap into the gas line, wherein said hole is positioned in said cap such that said hole is positioned for inserting the object such that the object is slidably positionable and rotatable relative to said tube;
at least one gasket complementary to and positioned in said cap, said at least one gasket being annular disk shaped, wherein said at least one gasket is positioned in said cap such that said at least one gasket is positioned for sealably coupling said cap to said tube, said at least one gasket comprising rubber;
a plug complementary to and positioned in an interior of said tube, said plug comprising wax;
a second channel positioned through said plug, said second channel being complementary to and aligned with said hole in said cap, wherein said second channel is positioned in said plug such that said second channel is positioned for inserting the object such that said plug is configured for substantially sealing the object within said tube for deterring leaking of gas from the gas line;
a snaking device comprising a motor, a coiled rod, and a bit, said coiled rod being operationally coupled to said motor, said bit being reversibly couplable to an endpoint of said coiled rod, wherein said hole is positioned in said cap, said second channel is positioned in said plug, and said first channel is positioned through said block such that said hole, said second channel, and said first channel are positioned for inserting said coiled rod such that said plug is configured for substantially sealing said coiled rod within said tube for deterring leaking of the gas from the gas line, wherein said endpoint of said coiled rod is positioned for coupling to said bit, wherein said coupler is positioned on said block such that said coupler is configured for coupling to the gas line for coupling said block to the gas line such that said bit is configured for inserting into the tap for positioning in the gas line, wherein said motor is positioned for rotating said coiled rod such that said bit rotates coincidently with said coiled rod, wherein said coiled rod is positioned for selectively extending from said snaking device into the gas line such that said bit is configured for grinding the blockage in the gas line, such as the calcium deposit, for clearing the blockage;
a frame, said frame being tubular;
a shell coupled to said frame, said coiled rod being positioned in and selectively extensible from a front of said shell, said shell being cylindrically shaped, said shell being tapered adjacent to said front;
a second plate coupled to said frame, said second plate being positioned on a back of said shell, said motor being coupled to said second plate, said motor being air powered;

a connector coupled to said motor, wherein said connector is positioned on said motor such that said connector is configured for coupling said motor to a compressed air supply;

a valve coupled to and positioned between said motor and said connector, said valve being two-way, wherein said valve is positioned on said motor such that said valve is configured for regulating air flow to said motor from the compressed air supply;

a pair of wheels coupled to said frame;

a handle coupled to said frame, wherein said handle is positioned on said frame such that said handle is configured for motivating said frame upon said wheels; and wherein said hole is positioned in said cap, said second channel is positioned in said plug, and said first channel is positioned through said block such that said hole, said second channel, and said first channel are positioned for inserting said coiled rod such that said plug is configured for substantially sealing said coiled rod within said tube for deterring leaking of the gas from the gas line, wherein said endpoint of said coiled rod is positioned for coupling to said bit, wherein said recess is positioned in said block such that said recess is configured for positioning said block on the gas line, wherein said coupler is positioned on said block such that said coupler is configured for coupling to the gas line for coupling said block to the gas line such that said first channel is aligned with the tap positioned in the gas line such that said bit is configured for inserting into the tap for positioning in the gas line, wherein said motor is positioned for rotating said coiled rod such that said bit rotates coincidently with said coiled rod, wherein said coiled rod is positioned for selectively extending from said snaking device into the gas line such that said bit is configured for grinding the blockage in the gas line, such as the calcium deposit, for clearing the blockage, wherein said connector is positioned on said motor such that said connector is configured for coupling said motor to the compressed air supply, wherein said valve is positioned on said motor such that said valve is configured for regulating the air flow to said motor from the compressed air supply.

* * * * *